Figure 4:
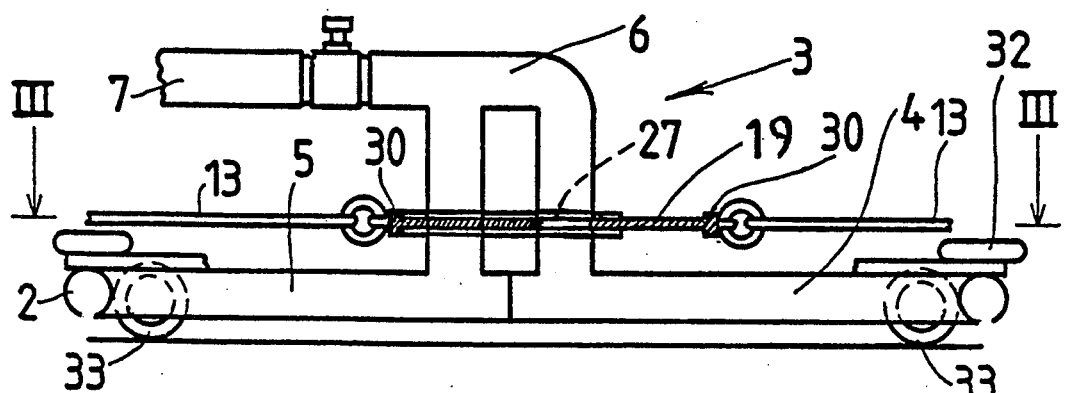

United States Patent [19]

Moore

[11] Patent Number: 5,366,638
[45] Date of Patent: Nov. 22, 1994

[54] SPECIFIC GRAVITY SEPARATING UNIT

[76] Inventor: Richard P. Moore, c/o Black Reef Rd. & Moore St., Germiston, South Africa

[21] Appl. No.: 878,775
[22] Filed: May 5, 1992
[30] Foreign Application Priority Data

May 7, 1991 [ZA] South Africa .................. 91/3427

[51] Int. Cl.$^5$ .......................................... B01D 21/04
[52] U.S. Cl. .................................... 210/802; 210/803; 210/519; 210/521; 210/525; 210/527
[58] Field of Search .............. 210/519, 521, 523, 525, 210/527, 533, 801, 802, 803

[56] References Cited

U.S. PATENT DOCUMENTS

| | | | |
|---|---|---|---|
| 2,137,421 | 11/1938 | Tark | 210/525 |
| 3,669,271 | 6/1972 | McGivern | 210/527 |
| 3,886,064 | 5/1975 | Kosonen | 210/519 |
| 3,928,209 | 12/1975 | Engdahl et al. | 210/519 |
| 4,156,644 | 5/1979 | Richard | 210/519 |
| 4,310,415 | 1/1982 | Webb | 210/242.3 |
| 4,401,576 | 8/1983 | Meurer | 210/525 |
| 4,514,303 | 4/1985 | Moore | 210/525 |
| 4,830,748 | 5/1989 | Hall | 210/525 |
| 5,047,150 | 9/1991 | Mitchell | 210/525 |
| 5,078,869 | 1/1992 | Di Gregorio et al. | 210/527 |

FOREIGN PATENT DOCUMENTS 841640 6/1981 U.S.S.R. .

*Primary Examiner*—Christopher Upton

[57] ABSTRACT

Diagonal flow pattern of inclined sheet settling system achieved by elongated rows of inclined sheets adjacent to elongated, outlet weirs discharging directly into elongated outlet channels with non turbulent distribution of the incoming liquid throughout the elongated length of the inclined sheets and means to remove settled material from the elongated floor of the said system by means of a power motivated reversing rope driven floor mounted and floor spanning reciprocating trolley that is able to take up the settled material from the floor and deliver this via a flexible hose and hydrostatic head to the exterior of the unit, and that does not require floor pockets.

18 Claims, 4 Drawing Sheets

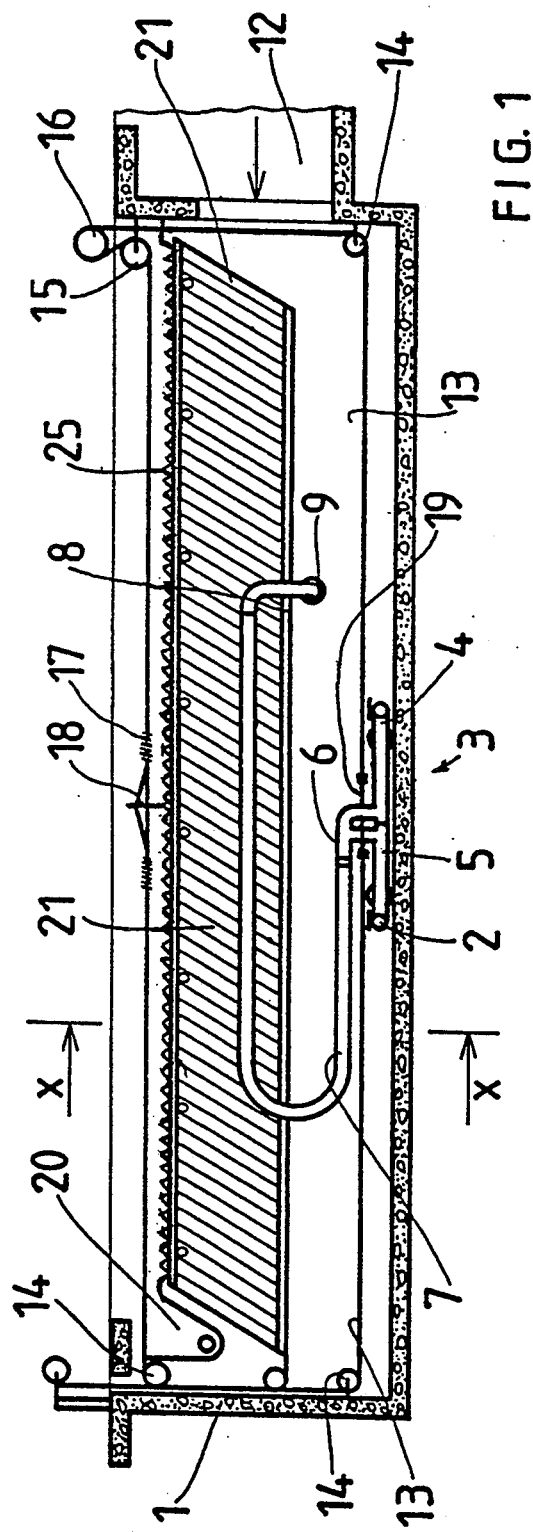
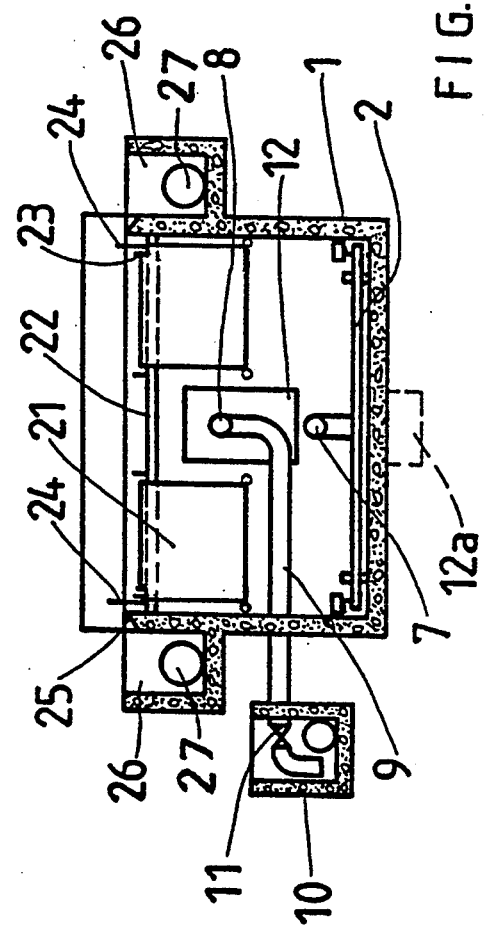
FIG. 1
FIG. 2

SPECIFIC GRAVITY SEPARATING UNIT

Field of the Invention

This invention relates to units that separate suspended particles or solids from liquids or materials of different specific gravities by the action of gravity, (settling tanks) means to remove the heavier settled or condensed solids from the unit (desludging) and means to remove the lighter factions from the surface (scum removal).

It particularly relates to that type of settling tank or settling system in which the liquid being processed is passed through a multiplicity of inclined tubes or passages between inclined plates, or sheets to reduce the distance that settleable particles in suspension in the liquid being processed, have to travel before coming to rest on the inclined surfaces and from where they amalgamate and slide down the inclined surface to a sludge removal system.

Description of the Prior Art

In my U.S. Pat. No. 4,514,303 I described an elongated rectangular settling unit with a dual row of inclined sheets adjacent the side walls and with a central passage for incoming liquid to be clarified between them and means to control the draw-off of clarified liquid evenly along the full length of the rows of inclined sheets by means of suitably positioned perforations or control orifices in the side walls of the unit.

First Aspect of the Invention

An aspect of the present invention relates to the control of flow through the inclined sheets. Whereas the above Patent envisaged a substantially horizontal flow pattern through the inclined sheets from the central channel to the perforated walls on the opposite sides of the sheets and all other inclined plate/sheet systems have a substantially vertical flow pattern from an underside to an upper-side or visa versa, the present invention envisages a substantially diagonal or oblique flow pattern whereby the liquid to be processed enters the passages between the inclined sheets from one side and an under-side and is withdrawn from an upper corner remote from the incoming side.

Apparatus to achieve this flow pattern includes the top corner draw-off of clarified liquid being effected by means of elongated, preferably serrated v notched weirs extending the full length of the rows of inclined sheets on each side wall discharging into elongated clarified liquid collecting channels.

Further, the inlet to the unit may be a relatively large, low velocity central wall inlet directed into the passage between the inclined sheets or the inlet may preferably comprise a channel in the floor throughout the length of the unit covered by orifice cover plates that distribute the incoming flow the length of the passage between the inclined sheets.

Prior Art of a Second Aspect of the Invention

In my U.S. Pat. No. 4,514,303 I also showed desludging by means of a reciprocating floor sweeping system with sludge hoppers in the floor at both ends of the elongated unit. Existing systems include scrapers or wipers that propel settled material to concentrating hoppers necessitating the construction of the hoppers in the floor and the provision of valve drainage systems from the hoppers. Others include siphon systems in which a perforated suction pipe is caused to traverse the floor of the settling tank and siphon-off the settled material. This latter system necessitates the construction of an elongated channel to receive the siphon discharge and means to prevent the breaking of the siphon during periodic inactivity, or alternatively, the provision of a pump. In such systems, also the travelling support system for the siphon is above the tank and may involve elaborate bridge structure. Other systems require guide rails on the floor or walls of the settling tank.

Summary of Second Aspect of the Invention

According to this aspect of the invention, a system to remove sludge or settled material from an elongated rectangular settling unit comprises a reciprocating trolley that rests on and operates on the floor of the unit, spans the settled floor width of the unit, reciprocates length-wise on the floor of the unit, sucks up the sludge and delivers it to the exterior of the unit and does not require any hoppers in the floor or guide rails on the walls or floor.

The suction system intake is preferably comprised by two floor sweeping pipes located at opposite ends of a reciprocating travelling cradle that rests on the floor mounted on wheels or v wipers inducing settled material to intake orifices in the underside of the floor sweeping pipes and with four guide wheels bearing on the settling tank side walls to prevent crabing of the cradle as it is caused to reciprocate from end to end of the settling tank floor.

The reason for the provision of two floor sweeping intake pipes is to ensure that even if the travel of the center of the cradle cannot reach each end of the floor, the floor sweeping suction pipes are able to. This is associated with the proposed drive means to reciprocate the cradle which visualises a single central traction rope attached to what amounts to both sides of the center of the cradle with rope drive means at the top of the tank that causes the traction rope to pull the cradle backwards and forwards along the floor of the settling tank via pulleys at both ends of the tank just above the floor sweeping pipes (to allow these to pass beneath) and further pulleys that guide what amounts to an endless loop traction rope that may also at the surface of the liquid motivate a floating scum wiper.

The floor sweeping pipes are connected, preferably each alternately via an automatics change over system to a common central pipe carried by the cradle and directed horizontally in the direction of travel and in turn connected to flexible conduit or hose positionally controlled thereby (and of a length somewhat longer than half the length of travel of the cradle) and the opposite end of which connects to a pipe at a higher level similarly directed to positionally control and receive it and in turn connected via bends to a sludge outlet pipe threading the settling tank wall above the cradle but below top water level in the settling tank so that liquid sludge from the settling tank will flow by gravity or hydrostatic head from the perforated floor sweeping pipes out of the settling tank while the cradle reciprocates back and forth across the floor of the tank sucking up settled material or sludge.

The sludge outlet pipe delivery would be provided with automatic valved means to be automatically triggered open when the automatic system controlling the movement of the floor sweeping system is activated.

The floor sweeping system may be automatically activated on a timed interval or other basis dependent on the accumulation of settled material.

In order to minimise the ratio of water flow to settled material when desludging it is envisaged that the leading floor sweeping pipe in the direction of travel of the cradle should always be automatically connected to the sludge discharge flow whilst the trailing floor sweeping pipe is isolated therefrom. To this end each floor sweeping pipe has separate conduit connection to the flexible hose with linked isolating means so that when one conduit is closed the other opens and such isolating means is motivated by the cradle traction rope to which it is attached.

Regarding the drive of the traction rope—this may be by electric motor and reduction gears with a V pulley transmitting the power to the rope maximum contact to which enhanced by a jockey pulley which can serve the dual purpose of tensioning the rope. Alternatively in a further aspect of the invention power may be transmitted to the drive rope by a number of coils round a drive drum sliding on a lubricated keyed shaft so that it remains positionally stationary whilst the rope winds backwards and forth with the reciprocation of the drive. The drive rope is maintained in tension either by connecting springs in its line or as mentioned by a sprung jockey pulley.

An important aspect of the invention is the direction and positioning of the pipes to which both ends of the flexible hose connects as this controls to a large extent the positioning and behaviour of the hose during the motion of the cradle but which may also be assisted by guides in an exceptionally long tank. The hose should have slightly boyant characteristics so that it will not rest on the floor under any circumstances. The boyancy of the hose may be adjusted by the diameter of an air filled and sealed smaller hose threading or attached thereto, and in larger installations instead of a single large hose a plurality of smaller sludge delivery hoses may be linked together with an air filled hose.

The delivery may be by hydrostatic head of the liquid in the settling unit with the sludge delivery point suitably below T.W.L. of the unit and without employing syphoning action.

It should be pointed out that although the invention basically envisages automatic desludging by hydrostatic head, where it may be desirable to deliver the sludge to a higher level or to some distance a pump may be connected directly to the delivery hose, the action of which pump may be automated with the travel of the cradle.

BRIEF DESCRIPTION OF DRAWINGS AND PREFERRED EMBODIMENT OF THE INVENTION

FIGS. 1 and 2 on Sheet 1 are overall small scale longitudinal and transverse cross sections respectively of a settling tank containing a preferred embodiment of the invention showing both the inclined sheet and desludging systems.

Figure 3:
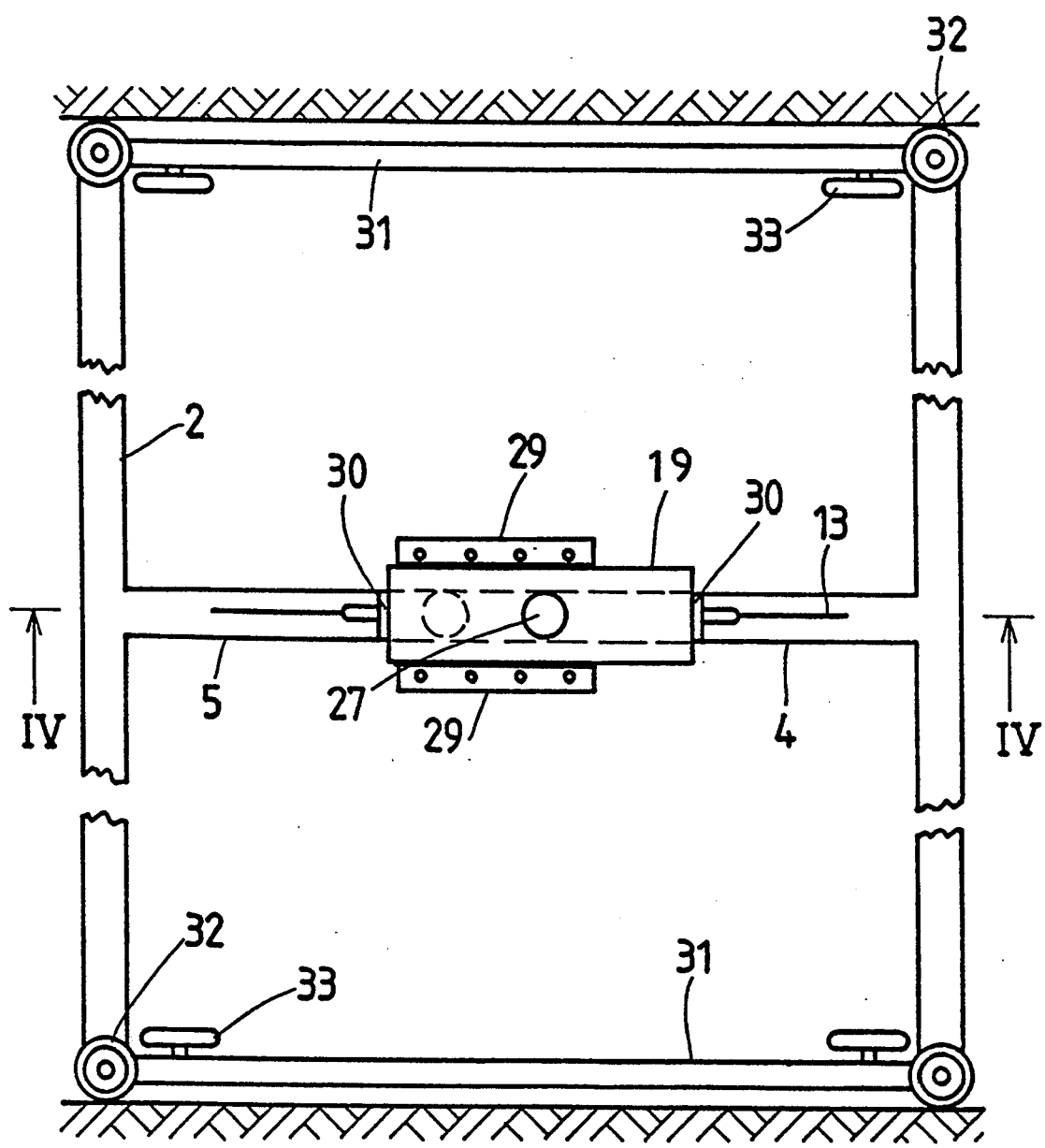

FIGS. 3 and 4 on sheet 2 are a plan and sectional elevation of the reciprocating trolley, it's mounting, guidance and drive systems and its suction connections showing a preferred changeover slide valve or gate motivated by the rope drive.

Figure 5:
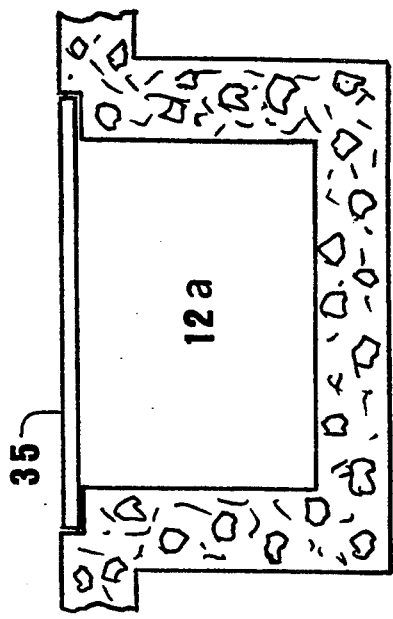
Figure 7:
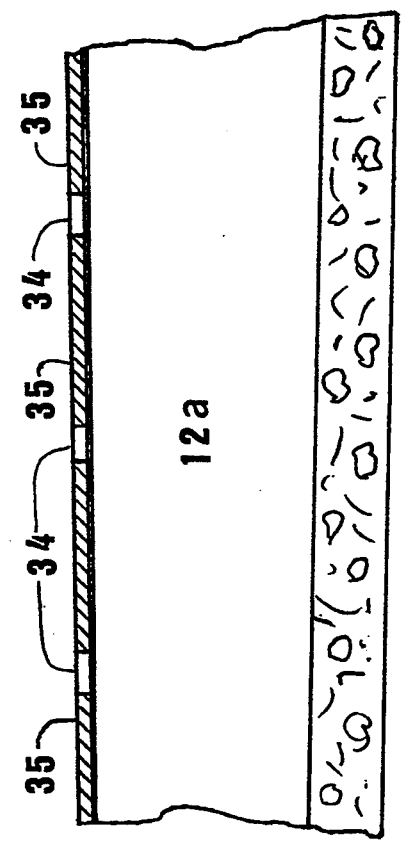
Figure 8:
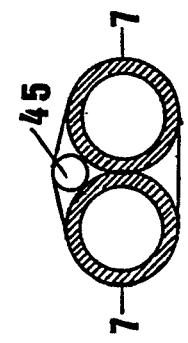
Figure 9:
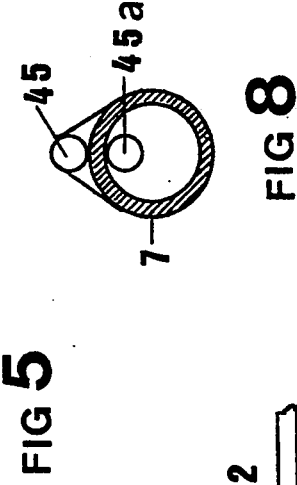
Figure 6:
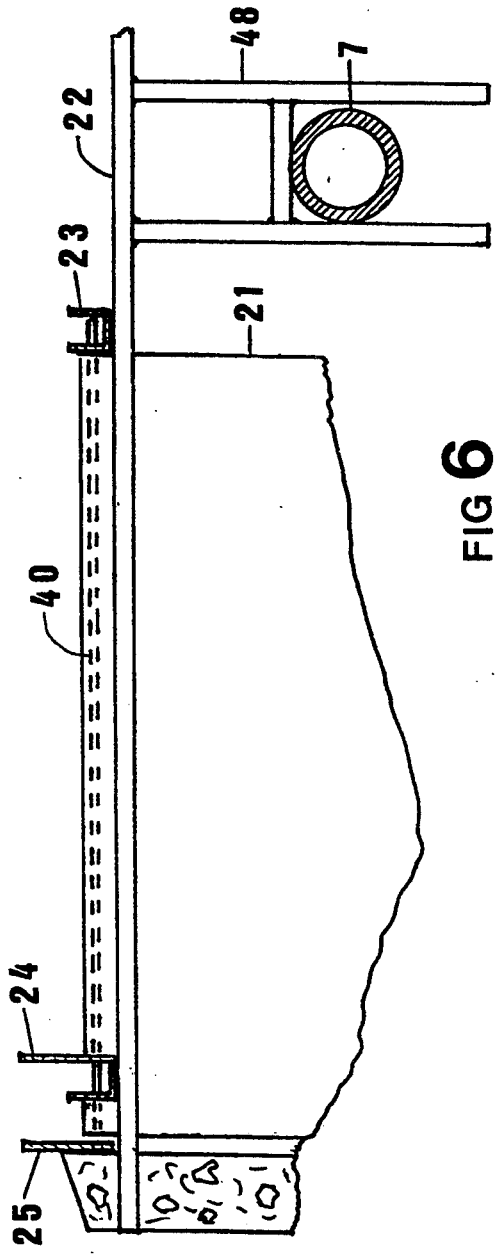

FIGS. 5, 6 and 7 on sheet 3 show enlarged details of how the inclined sheets are mounted and of the underfloor inlet to the settling tank, FIGS. 8 and 9 hose buoyancy means.

Figure 11:
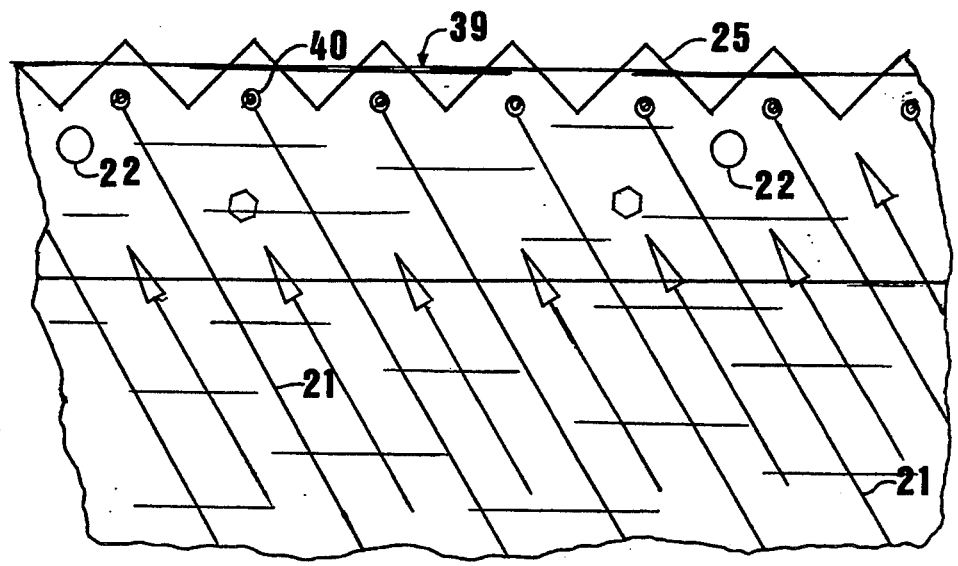
Figure 10:
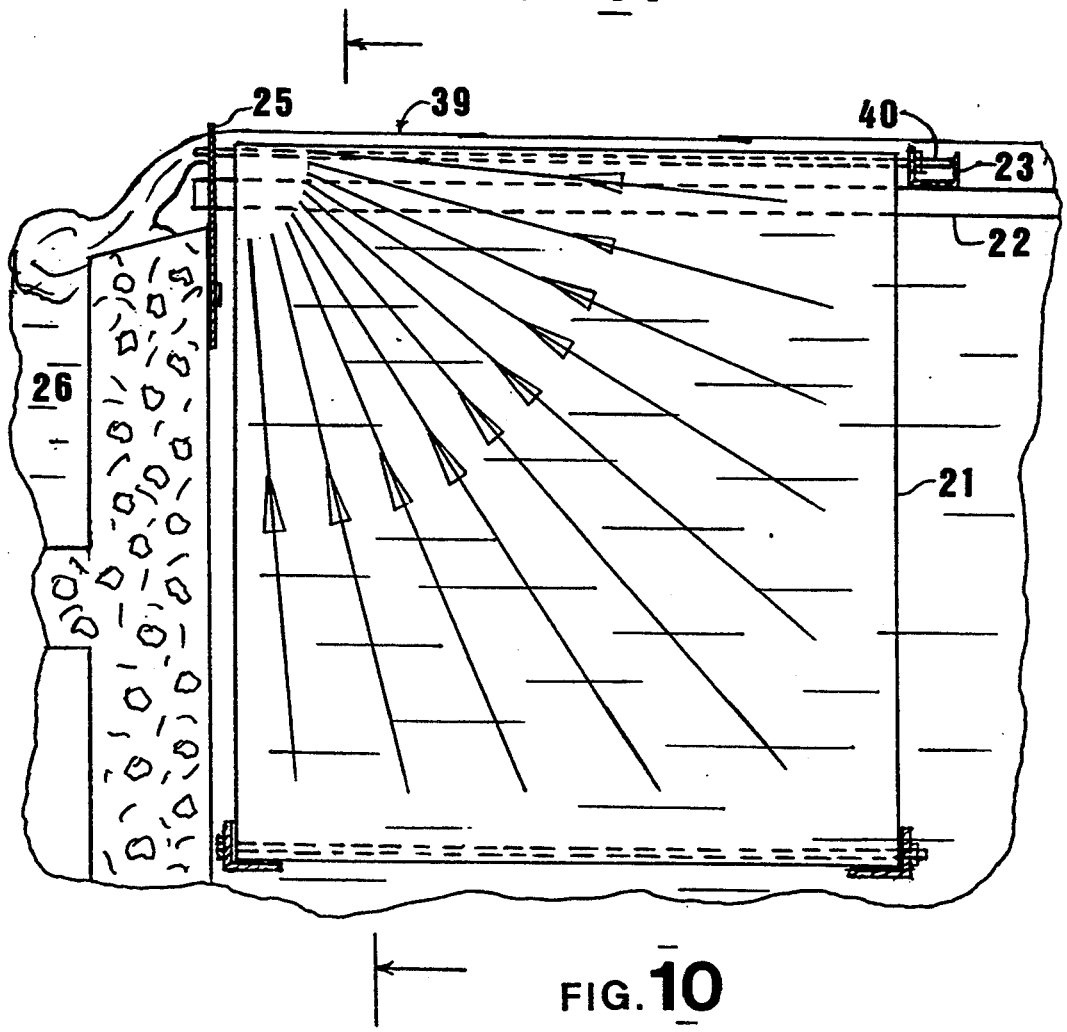

FIGS. 10 and 11 on Sheet 4 show in enlarged detail the special flow pattern through the passages between the inclined sheets, FIG. 10 on the flow line and FIG. 11 in cross-section through the sheets, showing also the serrated weir drawoff with the scum plate omitted as is normally the case in large, or in fact virtually all waterworks, as opposed to industrial waste or sewage works.

In all the drawings all items having the same identity have been given the same numbers.

MORE DETAILED DESCRIPTION OF THE DRAWINGS AND PREFERRED EMBODIMENTS

Referring first to the enhanced inclined sheet settling system in FIGS. 1 and 2—1 is the settling tank containing structure with elongated inclined sheet system 21 with elongated serrated weirs 25. Elongated settled water receiving channels 26 and settled water outlet conduits 27 to deliver the settled water which is passed over the weirs during operation of the plant.

A low velocity inlet 12 is provided that enters from that end wall of the unit away from from which the lower portion of the inclined sheets are angled. An alternative underfloor inlet that distributes the inlet flow throughout the length of the unit is shown at 12a.

FIG. 2 shows two rows of inclined sheets 21 with a space between them mounted on cross members 22 with channel sheet rod support frames 23 from which the swinging sheet system depends and which include scum retention blades 24 precluding scum from overflowing serrated weirs 25 that extend the full length of both side walls of the settling tank unit and deliver clarified liquid into clarified liquid channels 26.

FIGS. 1 and 2 further illustrate a simple and economic system for suspending the inclined sheet system in which a cross member 22 which may be relatively light such as a stainless steel rod or tube spans the distance between the outlet channels 26. The tubes pass through the channel walls at 28 and also support light stainless steel angle or channel sections 23 that provide a scum plate 24. The sections 23 are perforated to accomodate the stainless steel rods from which the individual inclined sheets are suspended.

FIG. 6, sheet 3 shows an enlarged detail of the mounting of the inclined sheets 21 on cross member 22 with longitudinal channels 23 perforated to receive sheet support rods 34. It also shows the serrated weir 25 and scum barrier plate 24.

Sheet 3, FIGS. 7 and 5 also illustrate in more detail the underfloor inlet to the system in which FIG. 5 is a transverse cross section and FIG. 4, a longitudinal cross section showing channel 12a sloping along its length. Removable cover plates 35 are provided for cleaning and have distribution openings 34 therethrough.

Generally the overall arrangement and structure provides even intake and output to the passages between the inclined sheets throughout the length of the inclined sheet system with minimum inlet velocities to the passages between the inclined sheets.

The invention further includes means for the removal of settled material from the floor of the settling tank as well as means to remove scum or floating material if required and FIGS. 1 and 2 show perforated sludge uptake pipes 2 mounted at both ends of reciprocating trolley 3 mounted on the floor of the settling unit by means of wheels 33 guided from crabbing by wheels 32 operable on the side wall of the tank. Sucked-up sludge flows via connecting pipes 5 or 4 and change over slide gate 19 and horizontally directed pipe 6 (in the centre of the trolley) to flexible hose 7 that is looped enough (FIG. 1) to permit end to end travel of trolley 3 and connects to horizontally directed sludge receiving pipe 8 that delivers the sludge via pipe 9 and automatic isolating valve 11 to sludge disposal pit 10. In order for the desludging system to function smoothly it is necessary for hose 7 to be horizontally directed to assume the functional shape indicated in the drawing and to this end it may be necessary additionally to provide guides 48, FIG. 6 depending from cross member 22 to maintain the hose in the optimum vertical plane and floatation support means air hose 45 45a FIGS. 8 and 9 to prevent it subsiding.

FIG. 1 further indicates rope drive means 13 guided by pulleys 14 and 15 and motor reduction gear driven at 16 with springs 17 maintaining rope tension. FIG. 1 further shows scum receiving trough 20 into which scum may be wiped by wiper 18 motivated by the same rope system.

FIGS. 3 and 4 show an enlarged view of the trolley detailing the preferred automatic change over system for the sludge uptake pipes 2 in which pipe 2 is shown via pipe 4 connected to the flexible hose via opening 27 in the sludge gate 19 that, when the rope drive is reversed moves opening 27 to connect opposite sludge delivery pipe 5 to the flexible hose 7, when drive plate 30 comes to rest against a stop and imparts traction to the trolley. Part 6 is connected to the discharge pipes 4 and 5 of the trolley by flanges 29 that include a distance piece to guide and permit sliding of gate 19.

Where scum trapping and removal are not required in the settling stage as is typically the case in potable water supplies, FIGS. 10 and 11 (sheet 4) serve to indicate not only the flow pattern of the invention but also convenient mounting of the sheets when a scum plate is not required. Cross member 22 still spans and is supported from outlet channels 26 but in this instance via weir plate 25 that may also be perforated to receive sheet support rods 40. Identifying numbers for these figures are as previously given with the exception of 39 indicating typical operating water level.

I claim:

1. A process whereby in inclined plate settling systems having a tank with an inlet for liquid to be treated, an outlet for treated liquid, means to remove floated and sedimented material, and wherein a multiplicity of spaced inclined plates or sheets in two parallel rows form passages for the settling, clarification or processing passage of liquids therethrough, the improvement comprising the inlet admitting the liquid to be processed into the lower portion of a central area between the two rows such that entry of the liquid into the passages takes place from two adjoining sides, one of which is an underside and the other adjacent to the central area, of the substantially rectangular shaped inclined sheets and the outlet removing the clarified or processed liquid from the passages between the inclined sheets from the upper corner of the sides of the two rows of sheets opposite to the central area by an overflow weir, thereby forming a substantially oblique flow pattern through the passages between the sheets.

2. An inclined sheet settling system process as claimed in claim 1 in which the inlet to the structure of the process takes place from the direction away from which the bottom of the inclined sheets are inclined.

3. A settling tank installation comprising:

(a) a separating chamber having bottom, end and side walls;
(b) a pair of inclined plate assemblies, each assembly being mounted adjacent a side wall and extending substantially the entire length of the side wall such that a central space is formed between said assemblies, each inclined plate assembly comprising an elongated row of spaced inclined sheets suspended in the separating channel, said sheets being substantially perpendicular to the side walls and having an upper side at approximately the operating liquid level;
(c) liquid inlet means comprising an elongated channel below the bottom wall of the chamber extending under the central space substantially the length of the chamber, said channel being covered by a roof flush with the bottom and having opening means for distributing the liquid along the length of the chamber;
(d) liquid outlet means comprising an elongated overflow weir adjacent each side wall and extending substantially the length of the chamber; and
(e) reciprocating sludge removal means adjacent the bottom of the chamber.

4. A settling tank as claimed in claim 3 wherein each weir is located next to and delivers treated liquid into an elongated settled water receiving channel.

5. A settling tank as claimed in claim 3 in which a scumplate is provided between the sheets and the weir.

6. A settling tank as claimed in claim 3 in which dual rows of inclined sheets are supported by corrosion resistant light weight members transversely spanning between the settled water collecting channels and on which cross members, of corrosion resistant channel or angle shaped members provide scum plate means and have perforations to receive rods from which the inclined sheets depend.

7. A settling tank as claimed in claim 3 in which the surface weirs are serrated.

8. A settling tank as claimed in claim 3 wherein
(a) the bottom and side walls are flat hopperless and equipment free and the sludge removal means comprises:
(b) sedimented material uptake means comprising perforated suction pipes effectively spanning the width of the floor;
(c) a trolley mobile on the floor and carrying at its front and rear extemities said perforated suction pipe means;
(d) reversible reciprocating traction rope drive means for the trolley such that each suction pipe in turn reaches the end of the floor;
(e) flexible conduit means connected to the sedimented material uptake means and to conduit means threading a wall of the tank and delivering to the exterior thereof; and
(f) means to induce flow in the sedimented material removal system and to isolate the flow.

9. A settling tank as claimed in claim 8 wherein the trolley is mounted on the floor of the structure by wheels or skids and guided by wheels or skids bearing against the side walls of the structure.

10. A settling tank as claimed in claim 8 further comprising means in which the leading floor spanning sludge take-up pipe carried by the trolley delivers sludge to the flexible hose via automatic means carried by the trolley and triggered by its change in direction.

11. A settling tank as claimed in claim 10 in which the automatic means is a changeover valve automatically motivated with change in direction by the traction rope of the trolley.

12. A settling tank as claimed in claim 11 in which the changeover valve is in the form of a sliding gate.

13. A settling tank as claimed in claim 12 in which the traction rope is connected to opposite ends of the sliding gate and which sliding gate operates as a valve controlling the opening and closing of branch conduits connected to the sludge up-take pipes so that before traction of the trolley commences the new leading sludge up-take pipe is connected to the sludge delivery hose and the new trailing sludge up-take pipe is isolated from the delivery hose by the sliding of the gate, which, on reaching limiting stops, transfers traction to the trolley.

14. A settling tank as claimed in claim 8 in which the flexible hose has guiding and control means to facilitate the unimpeded operation and travel of the trolley from end to end of the elongated settling tank floor including horizontally directed connections in the direction of travel to which both ends of the hose are attached, guide rods that depend from the settling system supporting cross member, hose flexibility and buoyancy that may be enhanced by a smaller air filled hose threading or attached to one or more sludge delivery hoses.

15. A settling tank as claimed in claim 8 in which the flow inducing means is by hydrostatic head or pump suction and in which such means is triggered by or coincides with initiated movement of the desludge trolley and the desludge is caused to cease with such movement.

16. A settling tank as claimed in claim 8 in which traction to the rope drive is effected by a drum around which the rope is coiled to receive traction and which drum slides horizontally on a keyed shaft to automatically maintain the rope position regardless of the winding of the rope on the drum.

17. A settling tank as claimed in claim 8 in which traction to the rope is imparted by a V pulley with enhanced contact achieved by a jockey pulley that may also maintain rope tension and with guide pulleys for the rope as shown on the drawing, 18. A settling tank as claimed in claim 8 in which the rope drive also motivates a surface or scum skimming system into a single scum receiving trough at one end of the settling system with means for inactivation of the skimming action on the reverse travel of the skimming system.

* * * * *